(12) United States Patent
Mory et al.

(10) Patent No.: US 8,508,577 B2
(45) Date of Patent: *Aug. 13, 2013

(54) DISPLAY OF AN ARRANGEMENT OF A PANORAMIC VIDEO BY APPLYING NAVIGATION COMMANDS TO SAID PANORAMIC VIDEO

(75) Inventors: Benoit Mory, Paris (FR); Nicolas Santini, Paris (FR)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/038,698

(22) Filed: Mar. 2, 2011

(65) Prior Publication Data

US 2011/0149017 A1    Jun. 23, 2011

Related U.S. Application Data

(63) Continuation of application No. 10/218,204, filed on Aug. 13, 2002, now Pat. No. 7,916,168.

(30) Foreign Application Priority Data

Aug. 14, 2001 (FR) ...................... 01 10807

(51) Int. Cl.
H04N 7/00 (2011.01)

(52) U.S. Cl.
USPC ............................................. 348/36; 348/39

(58) Field of Classification Search
USPC .................... 348/333, 231, 333.05, 334, 552, 348/438, 148, 39, 105, 207, 207.99, 723, 348/720, 36; 725/87, 61, 46
See application file for complete search history.

(56) References Cited

U.S. PATENT DOCUMENTS

| | | | |
|---|---|---|---|
| 5,510,811 A | 4/1996 | Tobey | |
| 6,032,098 A | 2/2000 | Takahashi | |
| 6,337,683 B1 | 1/2002 | Gilbert | |
| 6,356,297 B1 | 3/2002 | Cheng | |
| 6,466,198 B1 | 10/2002 | Feinstein | |
| 6,559,846 B1 | 5/2003 | Uyttendaele | |
| 6,690,268 B2 | 2/2004 | Schofield | |
| 7,170,518 B1 | 1/2007 | Millington | |
| 7,916,168 B2 * | 3/2011 | Mory et al. ................. | 348/36 |
| 2002/0021353 A1 | 2/2002 | DeNies | |
| 2002/0089587 A1 | 7/2002 | White | |
| 2003/0154474 A1 * | 8/2003 | Bertram ................... | 725/31 |
| 2003/0197785 A1 | 10/2003 | White | |
| 2004/0148102 A1 | 7/2004 | McCarthy | |

FOREIGN PATENT DOCUMENTS

EP    0930584 A2    7/1999

* cited by examiner

Primary Examiner — Behrooz Senfi

(57) ABSTRACT

An arrangement of a panoramic video is obtained by applying navigation commands to said panoramic video. The navigation commands are formed either by navigation commands given at will by the user, or by predefined navigation commands associated with said panoramic video. The choice of the type of navigation command used at a given instant is controlled either automatically or by the user. In this way, it is avoided that a user loses the thread of the action while permitting free navigation through a panoramic video.

15 Claims, 1 Drawing Sheet

DISPLAY OF AN ARRANGEMENT OF A PANORAMIC VIDEO BY APPLYING NAVIGATION COMMANDS TO SAID PANORAMIC VIDEO

This application is a continuation of prior U.S. patent application Ser. No. 10/218,204, filed Aug. 13, 2002, which claims the benefit of French Patent Application No. 0110807, filed Aug. 14, 2001, the entire contents of each of which is incorporated herein by reference thereto.

FIELD OF THE INVENTION

The invention relates to display equipment of a video arrangement by applying navigation commands to a panoramic video, comprising a control device intended to be manipulated by a user to define navigation commands in accordance with a display.

The invention also relates to a transmission system comprising such display equipment.

The invention also relates to a display method of a video arrangement by the application of navigation commands to a panoramic video, as well as a program comprising instructions for implementing such a method when it is executed by a processor.

With this type of equipment the user exactly controls that which he wants to see in a 360° landscape. Such equipment has a number of applications. It permits, for example, to display films or programs while having the impression of taking part in the action. It also permits to propose to a user interactive virtual visits of varied sites, for example, interactive virtual visits to houses, museums . . . .

BACKGROUND OF THE INVENTION

European patent application EP0930584A2 indicates that it is possible for a user to navigate in panoramic images by modifying the position and orientation of a view point that defines a certain field of vision.

But, when the user defines his navigation himself, he risks of being lost in the program. This is particularly annoying when the user displays programs such as films or re-runs of events because he then risks to lose the thread of the action.

It is an object of the invention to remedy this drawback.

SUMMARY OF THE INVENTION

This object is achieved with display equipment, a display method, a transmission program and system as claimed in the claims 1, 5, 7 and 8, respectively, of the present application.

In accordance with the invention a selection device permits to apply to the panoramic video either a navigation defined by the user himself or a predefined navigation.

In a first embodiment the selection is controlled by the user. By way of example the user who freely navigates in a panoramic video may at any moment choose to apply a predefined navigation to refocus on the action. He can then resume manual control when he so wishes.

In a second embodiment the selection is controlled automatically. By way of example a predefined navigation is applied at certain predefined instants and between these predefined instants the navigation is freely defined by the user.

It will be noted that said European patent application EP0930584A2 also indicates that another way of creating an animation is to navigate in a sequence of positions and orientations which are predefined from the point of view. But this navigation mode eliminates any possibility of interaction for the user.

The invention proposes a combined use of navigation commands defined freely by the user and predefined navigation commands. The invention also permits to profit by the advantages of each of the two modes of navigation cited in the prior art.

The predefined navigation commands are formed each by one or more files associated to said panoramic video and containing each a sequence of navigation commands that corresponds to a particular arrangement of the panoramic video. Such a file is, for example, a description file of said panoramic video in which camera motion parameters are defined, which camera motion parameters form said predefined navigation commands. Such a file is in conformity, for example, with MPEG-7 standard.

BRIEF DESCRIPTION OF THE DRAWINGS

These and other aspects of the invention are apparent from and will be elucidated, by way of non-limitative example, with reference to the embodiment described hereinafter.

In the drawings.

DESCRIPTION OF PREFERRED EMBODIMENTS

Figure 1:
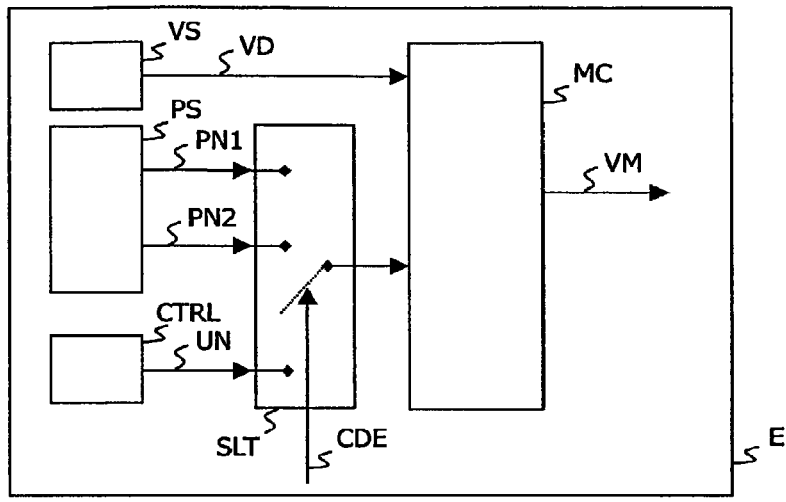
FIG. 1 is a general functional diagram of an example of display equipment according to the invention.

In FIG. 1 is represented a general functional diagram of an example of equipment according to the invention of a display of an arrangement of a panoramic video via the application of navigation commands to said panoramic video.

The display equipment E comprises a panoramic video source VS. This source VS supplies video data VD which are transmitted to a mounting device MC intended to form an assembly VM of said panoramic video.

The equipment E also comprises a control device CTRL intended to be manipulated by a user for defining navigation commands UN in accordance with the display. This control device is formed, for example, via a mouse.

The equipment E also comprises a predefined navigation command source PS. In FIG. 1 this source PS delivers two sequences of navigation commands referenced PN and 1 and PN2.

The navigation commands UN, PN1 and PN2 are supplied to a selection device SLT. The selection device receives a command CDE for selecting either the navigation commands UN defined by the user, or anyone of sequences of predefined navigation commands PN1 and PN2 produced by the navigation command source PS. The selection device SLT then supplies the selected navigation commands to the assembly MC.

The command CDE is formed either by a user command or by an automatic command. When the command CDE is a user command, the user can choose at any moment the navigation commands to be applied to the assembly MC. More particularly, he has the possibility of refocusing on the action by using predefined navigation commands. When the command CDE is an automatic command, predefined navigation commands PN1 or PN2 are applied, for example, at certain predefined instants among which they are the navigation commands UN defined by the user that are applied. This embodiment permits to supply to the user guides for navigation through program so that he can freely navigate between said view points imposed for modifying his field of vision. The imposed view points advantageously correspond to the important events of the program. Thus the user no longer runs the risk of losing the thread of the action.

Figure 2:
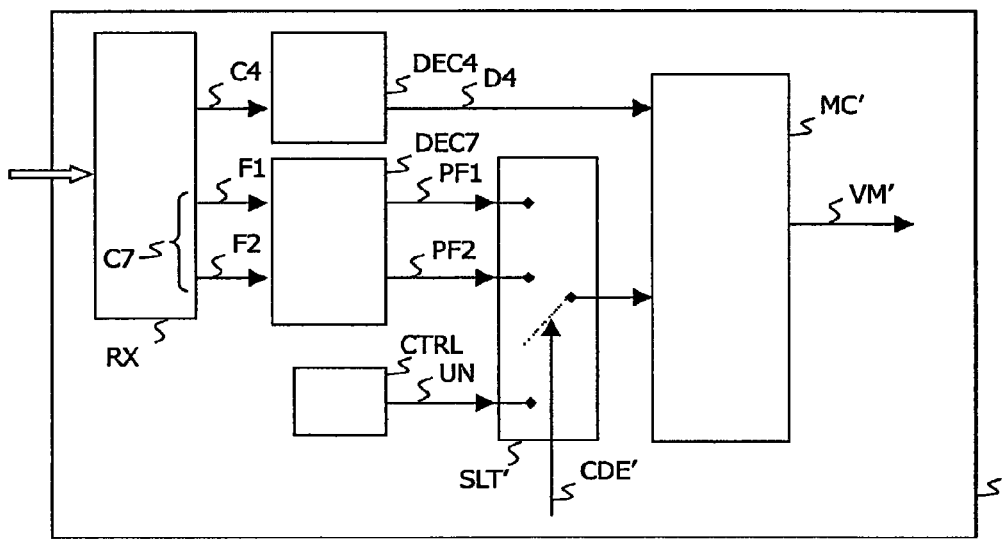
FIG. 2 is a functional diagram of a preferred embodiment of display equipment according to the invention.

In FIG. 2 is represented a functional diagram of a preferred embodiment of equipment E' according to the invention. According to FIG. 2 the equipment E' comprises a receiver RX for receiving data C4 coded in the MPEG-4 format, which represent said panoramic video (MPEG-4 is a coding standard for audio/video objects which is defined by the ISO). The equipment E' also comprises an MPEG-4 decoder referred to as DEC4 for decoding the coded data C4. The decoded data D4 delivered on the output of the decoder DEC4 are supplied to a mounting device MC'.

The receiver RX advantageously also receives data C7 coded in the MPEG-7 format, associated to the data C4 and which contain predefined navigation commands (MPEG-7 is a standard of describing the contents of the video defined by the ISO, which defines a certain number of video contents descriptors, notably a camera motion descriptor; according to the invention the camera motion descriptors contained in an MPEG-7 file are advantageously used as predefined navigation commands). The equipment E' then comprises a decoder DEC7 for decoding the data C7 and extract the predefined navigation commands. In FIG. 2 the data C7 are formed by two MPEG-7 files referred to as F1 and F2. These two files F1 and F2 are supplied to the input of the decoder DEC7. The decoder DEC7 decodes the files F1 and F2 and extracts therefrom two predefined navigation command sequences PF1 and PF2. The two predefined navigation command sequences are supplied to a selection device SLT'. The selection device SLT' receives a command CDE' for selecting either the navigation commands UN defined by the user, or anyone of the predefined navigation command sequences PF1 and PF2 supplied by the decoder DEC7. The selection device SLT' then supplies the selected navigation commands to an assembly device MC'.

Figure 3:
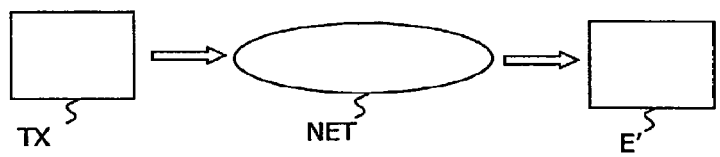
FIG. 3 is a block diagram of an example of a transmission system according to the invention.

In FIG. 3 is represented a transmission system according to the invention which comprises:
  a transmitter TX for transmitting data representing a panoramic video (for example, data coded in the MPEG-4 format), and commands of predefined navigations associated to said panoramic video (for example, one or more files of the MPEG-7 format which contain such predefined navigation commands);
  a transport network (NET);
  display equipment of a panoramic video assembly (for example, equipment of the type E' described with regard to FIG. 2).

In another embodiment of the invention (not shown), the data representing the panoramic video and the associated predefined navigation commands are stored on a medium (for example, on a disc) intended to be read by the display equipment.

In practice the invention is utilized by using software means. For this purpose, equipment according to the invention comprises one or more processors and one or more program storage memories, said programs containing instructions for the use of the functions that have just been described when they are executed by said processors.

The invention claimed is:

1. A system for forming an assembly of a panoramic video having a plurality of viewpoints corresponding to a plurality of events, the system comprising:
  a control device configured to define one or more first navigation commands;
  a navigation device configured to provide at least one plurality of predefined navigation commands;
  a mounting device configured to form the assembly of the panoramic video in accordance with a selection; and
  a selection device configured to receive the selection of one of the first and predefined navigation commands and forward the selected navigation command to the mounting device, the first and predefined navigation commands control position and orientation of the viewpoint defining a field of vision without losing a thread of action of the panoramic video, with the selection being one of an automatic selection generated at predefined instants and a manual selection generated at any instant during the display of the panoramic video.

2. The system of claim 1, wherein the selection device is configured to select the predefined navigation command at predefined instants.

3. The system of claim 2, wherein the selection device is configured to provide guides for navigation between the viewpoints of the panoramic video.

4. The system of claim 1, further comprising:
  a receiver configured to receive coded panoramic video and associated predefined navigation commands; and
  a decoder configured to decode the received coded panoramic video and associated predefined navigation commands.

5. The system of claim 4, further comprising:
  a transport network; and
  a transmitter configured to transmit the coded panoramic video and associated predefined navigation commands to the receiver over the transport network.

6. The system of claim 4, further comprising a medium reader configured to read the coded panoramic video and associated predefined navigation commands.

7. The system of claim 6, wherein the medium is a magnetic computer readable medium.

8. The system of claim 1, wherein the predefined navigation commands are formed by one or more files associated with the panoramic video and comprise a sequence of navigation commands corresponding to a particular arrangement of the panoramic video.

9. The system of claim 8, wherein the one or more files describe camera motion parameters in the panoramic video, the camera motion parameters form the predefined navigation commands.

10. A method for displaying on a mounting device an assembly of a panoramic video, the method comprising acts of:
  setting a plurality of viewpoints corresponding to a plurality of events in the panoramic video;
  defining one or more first navigation commands;
  providing at least one plurality of predefined navigation commands;
  receiving by a processor a selection of one of the first and predefined navigation commands; and
  forwarding the selected command to the mounting device, the new and predefined navigation commands control position and orientation of the viewpoint defining a field of vision without losing a thread of action of the panoramic video; and
  displaying the panoramic video in accordance with the selection, with the selection being one of an automatic selection generated at predefined instants and a manual selection generated at any instant during the display of the panoramic video.

11. The method of claim 10, further comprising an act of selecting the predefined navigation at predefined instants.

12. The method of claim 11, further comprising an act of providing guides for navigation between the view points of the panoramic video.

13. The method of claim 10, further comprising acts of:
   receiving coded panoramic video and associated predefined navigation commands; and
   decoding the received coded panoramic video and associated predefined navigation commands.

14. The method of claim 13, further comprising an act of transmitting the coded panoramic video and associated predefined navigation commands over a transport network.

15. The method of claim 10, further comprising an act of providing one or more files associated with the panoramic video for forming the predefined navigation commands,
   wherein the one or more files comprise a sequence of navigation commands corresponding to a particular arrangement of the panoramic video and describe camera motion parameters in the panoramic video, the camera motion parameters form the predefined navigation commands.

* * * * *